C. LECHTENBERG.
HAY GATHERER AND LOADER.
APPLICATION FILED DEC. 9, 1911. RENEWED MAY 24, 1918.
1,309,861.
Patented July 15, 1919.
9 SHEETS—SHEET 1.
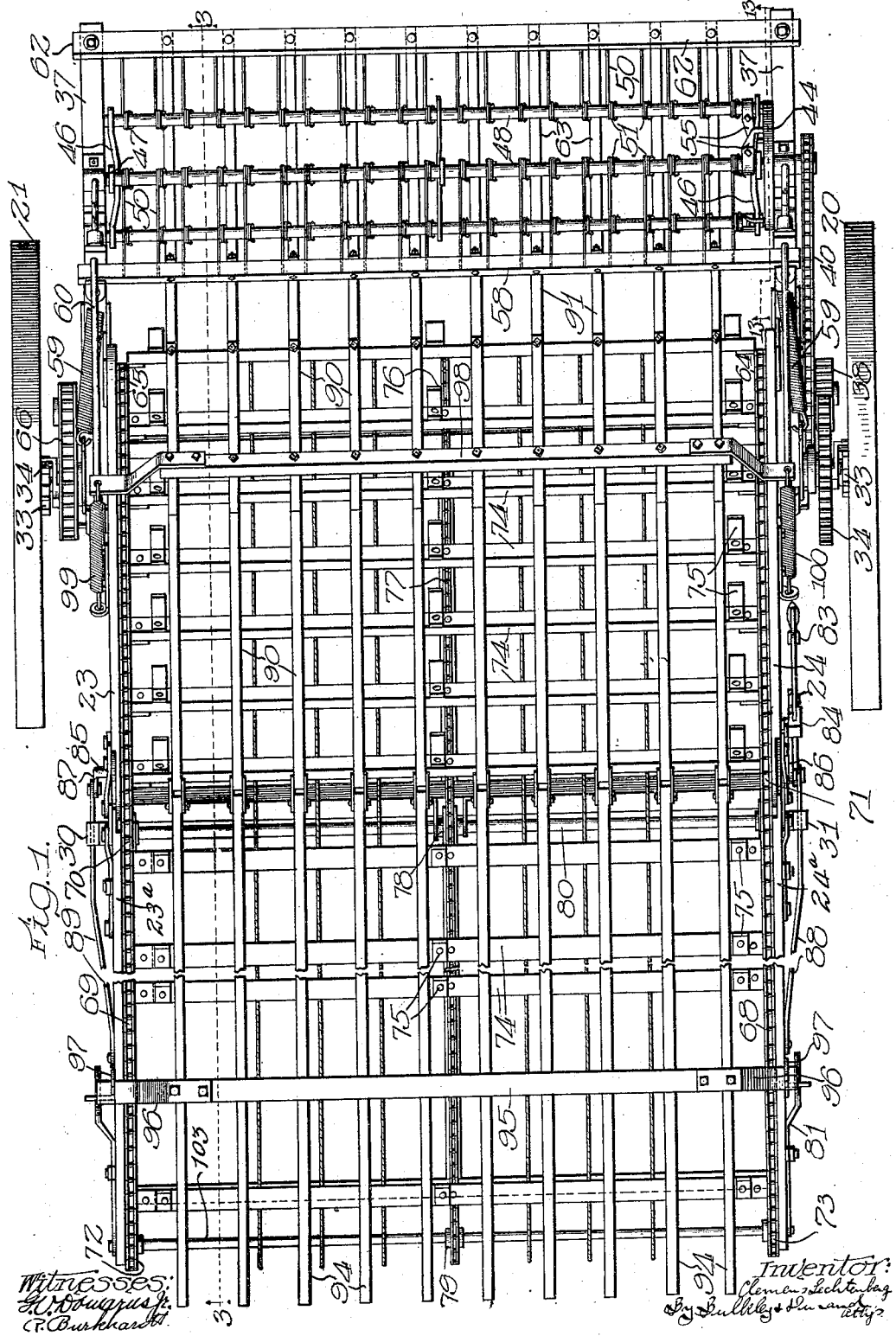

C. LECHTENBERG.
HAY GATHERER AND LOADER.
APPLICATION FILED DEC. 9, 1911. RENEWED MAY 24, 1918.
1,309,861.
Patented July 15, 1919.
9 SHEETS—SHEET 2.
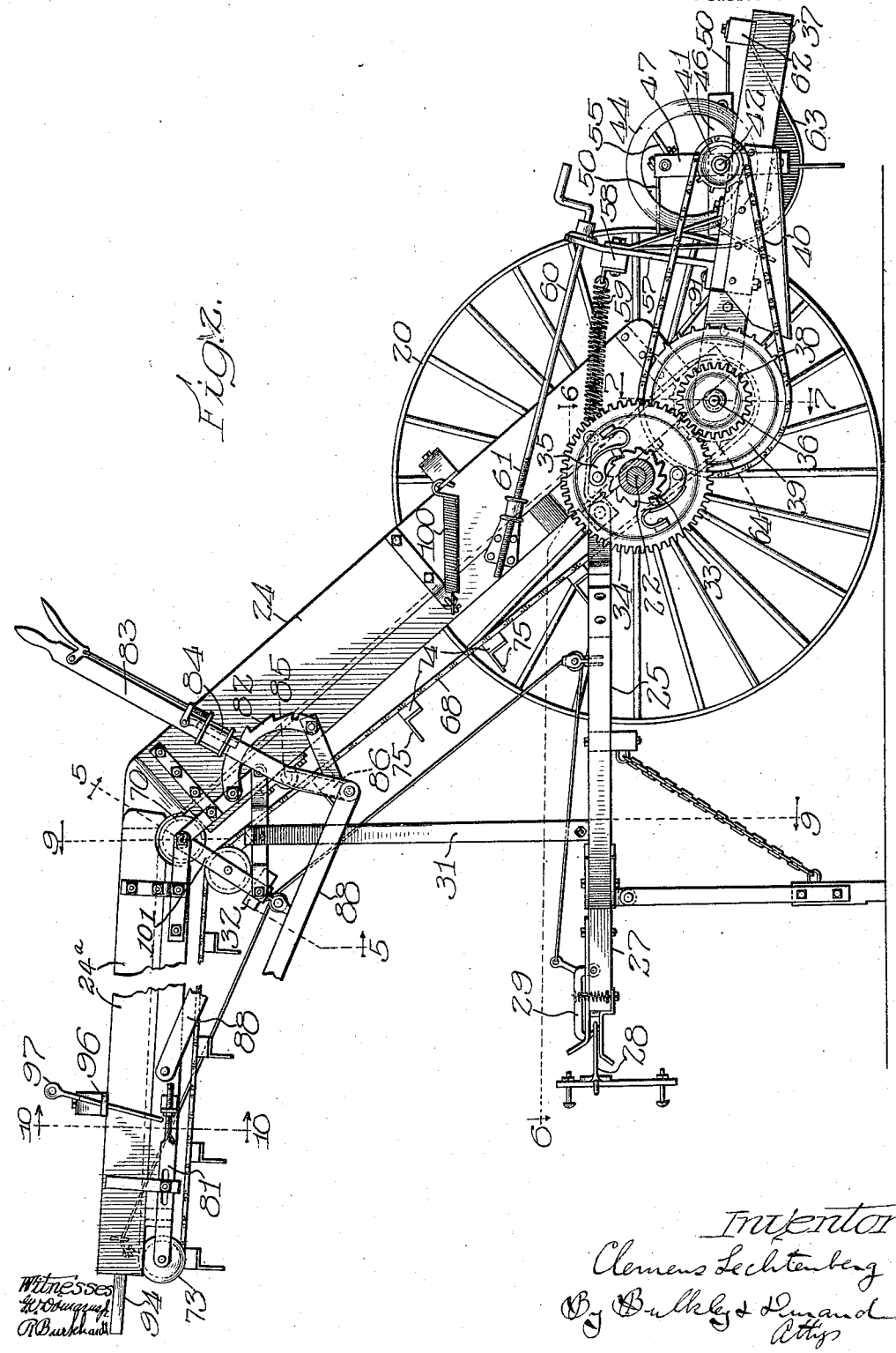

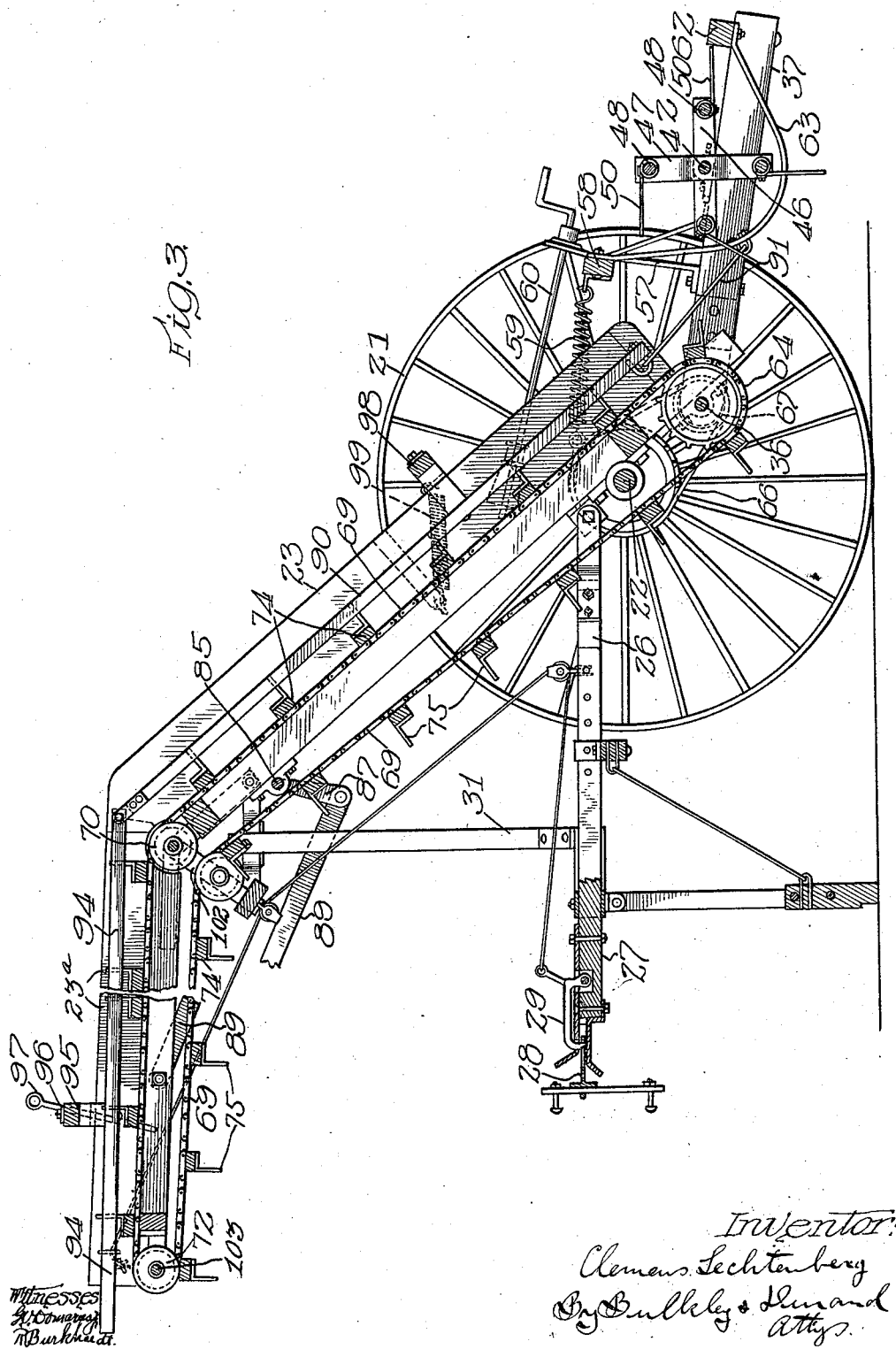

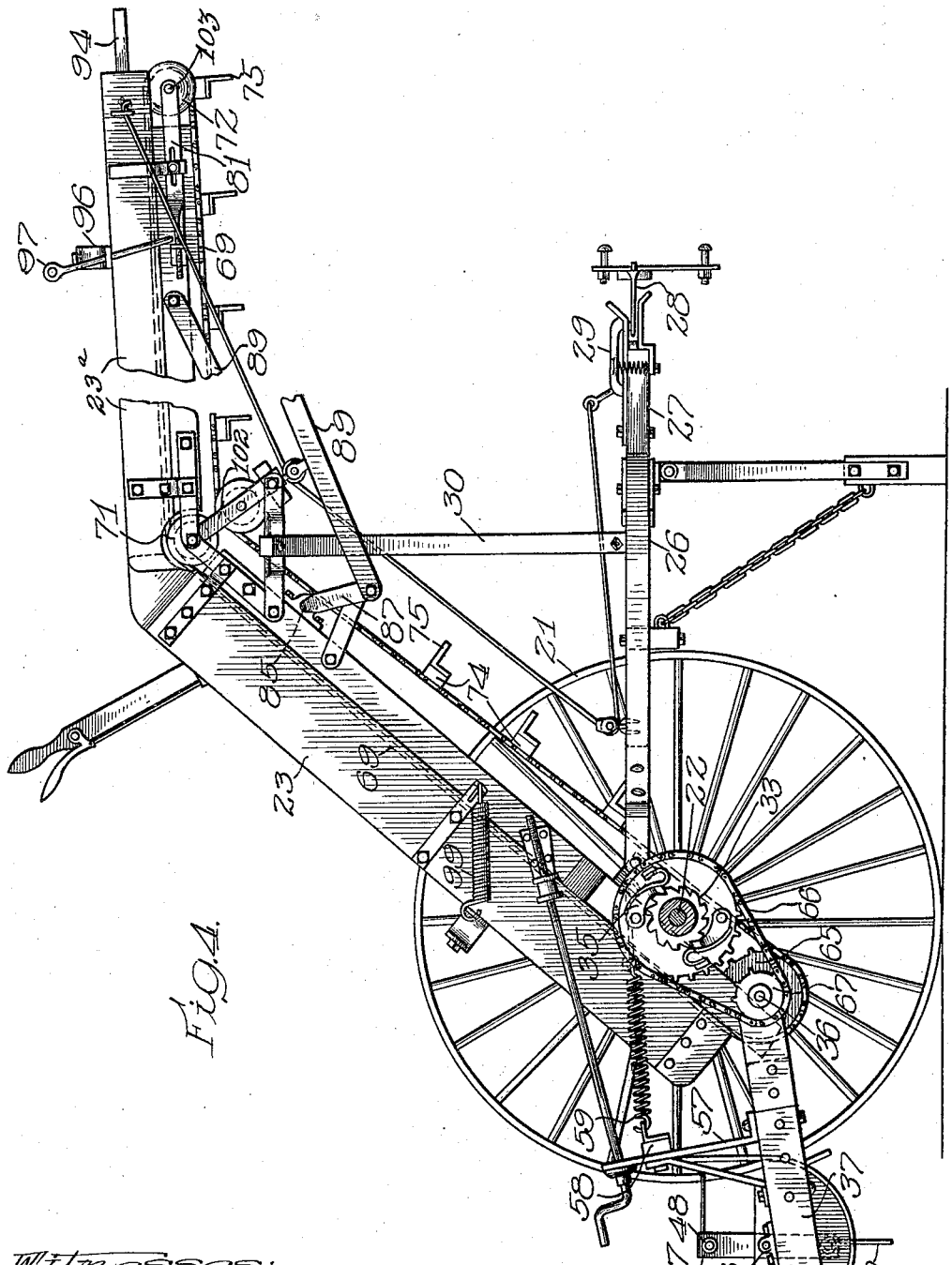

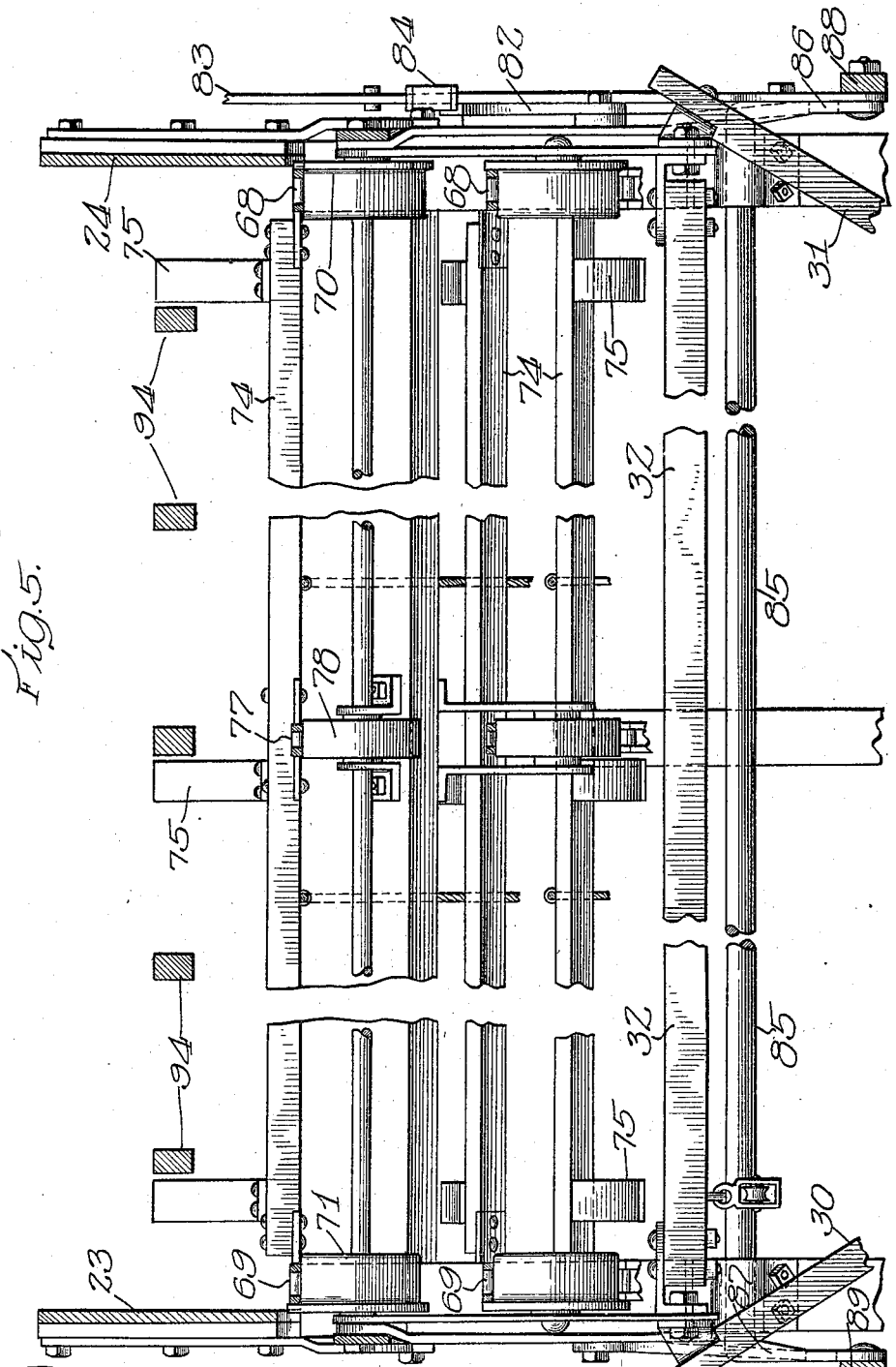

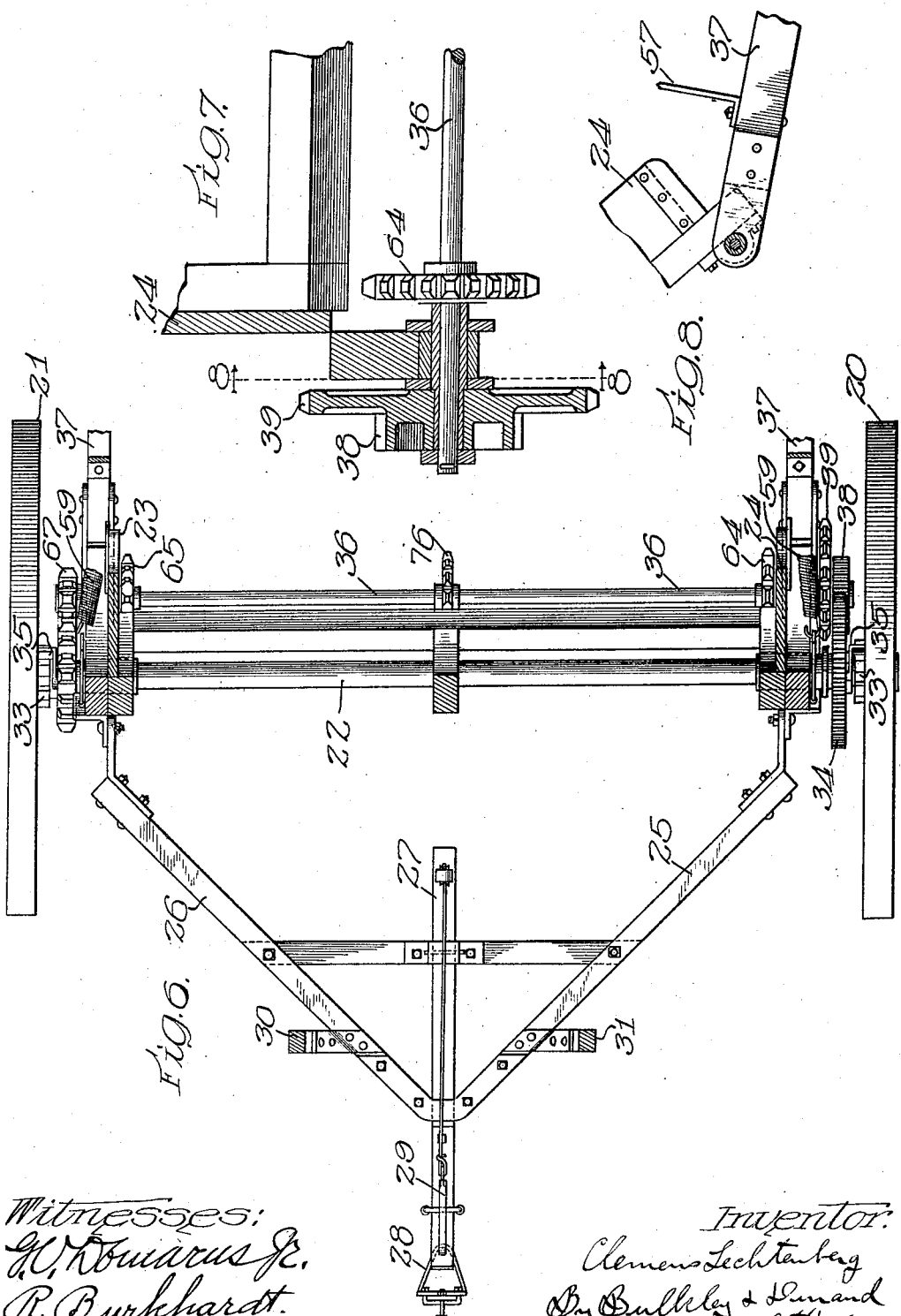

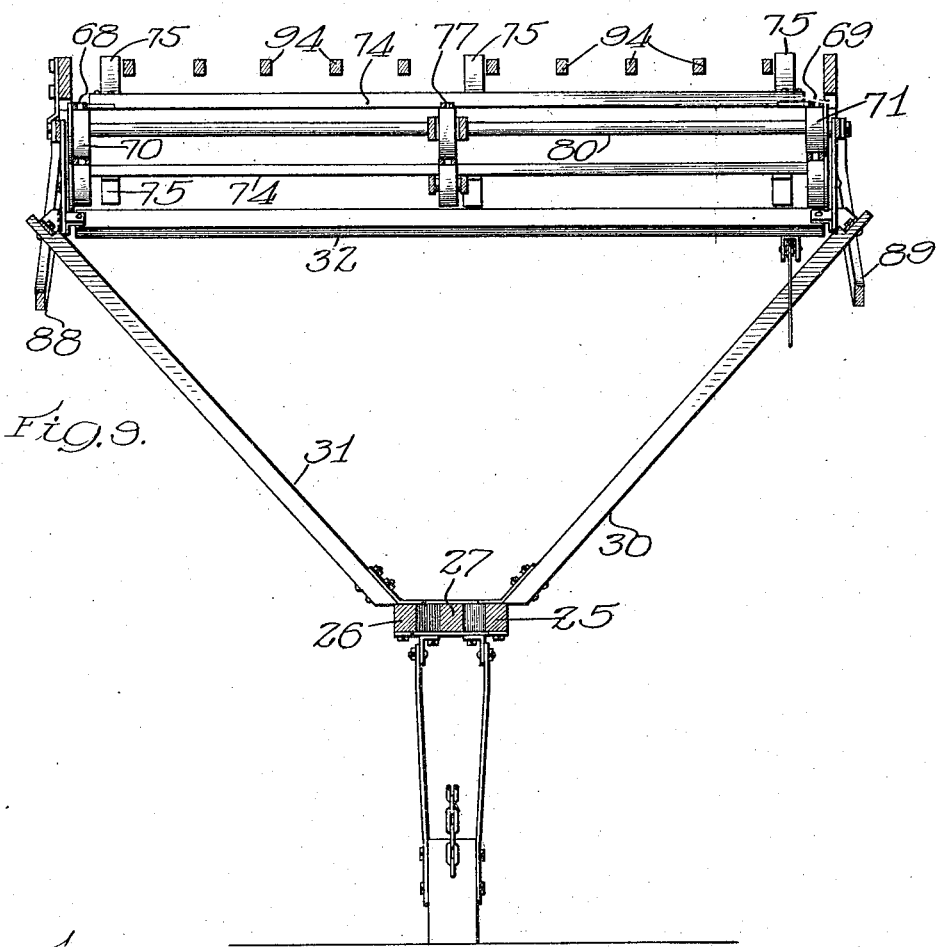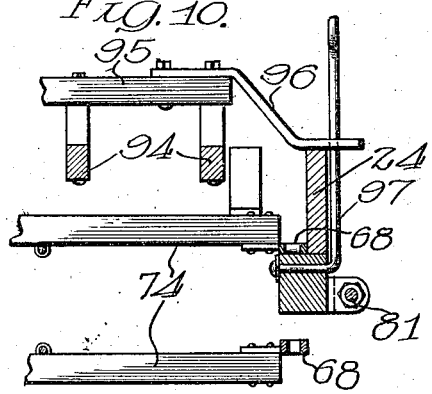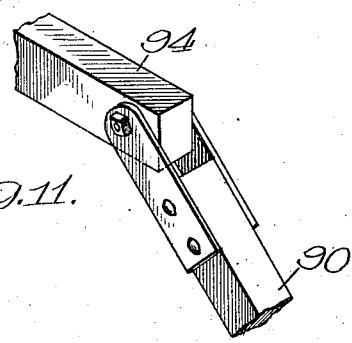

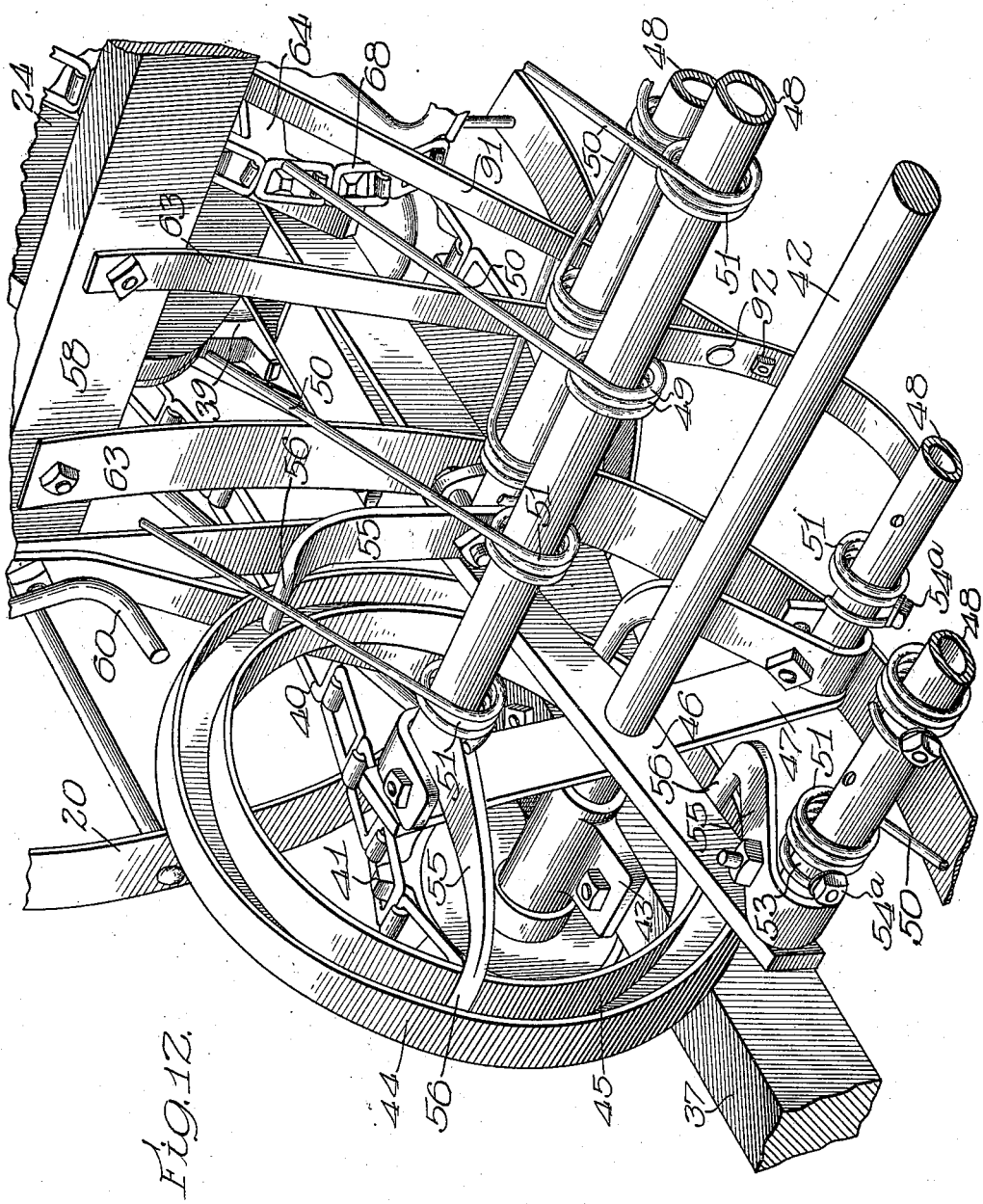

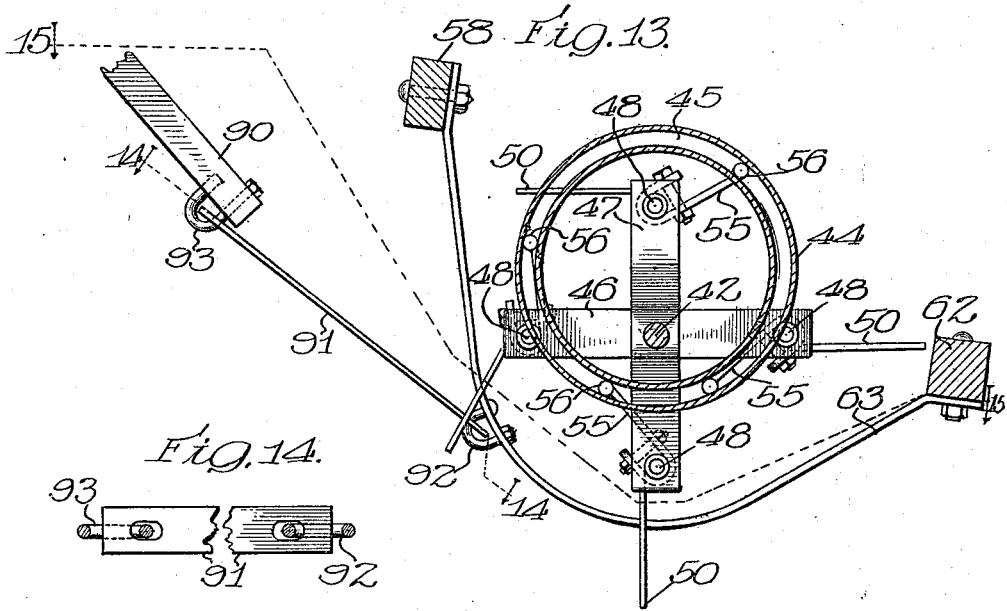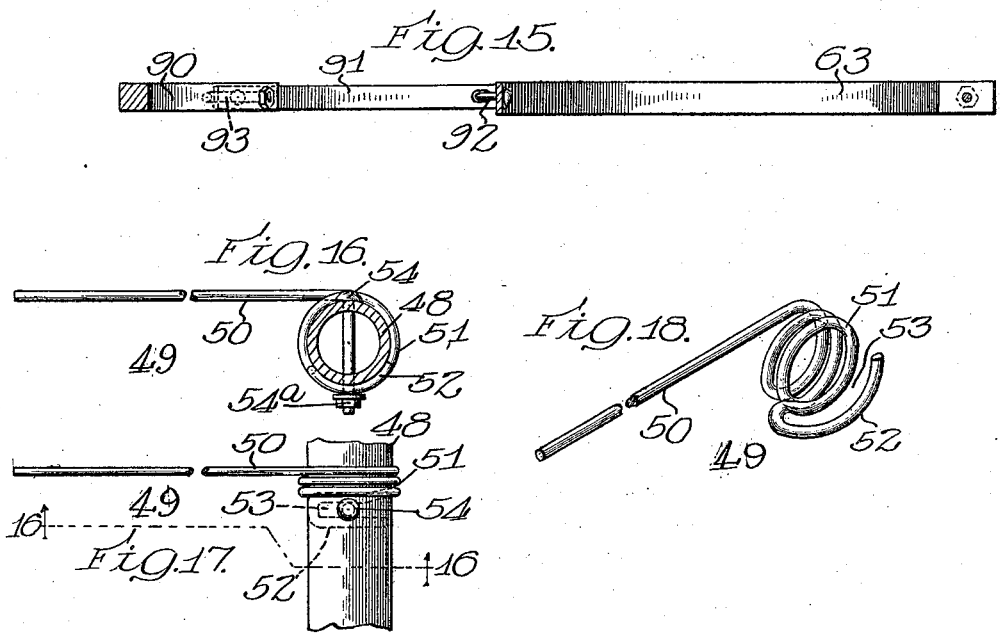

UNITED STATES PATENT OFFICE.

CLEMENS LECHTENBERG, OF ROCK ISLAND, ILLINOIS, ASSIGNOR TO ROCK ISLAND PLOW COMPANY, OF ROCK ISLAND, ILLINOIS, A CORPORATION OF ILLINOIS.

HAY GATHERER AND LOADER.

1,309,861. Specification of Letters Patent. Patented July 15, 1919.

Application filed December 9, 1911, Serial No. 664,700. Renewed May 24, 1918. Serial No. 236,412.

*To all whom it may concern:*

Be it known that I, CLEMENS LECHTENBERG, a citizen of the United States of America, and resident of Rock Island, county of Rock Island, State of Illinois, have invented a certain new and useful Improvement in Hay Gatherers and Loaders, of which the following is a specification.

My invention relates to hay loaders, and more particularly to that type of hay loaders in which a rotary rake mechanism is employed to pick up the hay and feed the same to a traveling elevator.

An object of my invention is to provide an improved construction whereby the operation of a hay loading mechanism is rendered more efficient and simple in operation.

Among the novel features of my invention is the provision of a single rotary raking mechanism which operates to feed the hay to a continuous elevator belt.

A further feature of my invention is in the provision of a jointed elevator which can be raised or lowered relative to the wagon or load of hay. This elevator comprises an endless conveyer and is so jointed that the conveyer remains tight in any position in which it is placed, without the provision of any spring tightener or similar device.

Further features of my invention reside in the particular construction of the rotary raking mechanism whereby the rake teeth are operated so as to pick up the hay, and are then withdrawn from the hay at the proper time. I likewise provide an improved construction of the rake teeth whereby these teeth can be readily adjusted in proper angular position.

These and other useful objects of my invention will be more readily understood by having reference to the accompanying drawings, in which—

Figure 1 is a plan view of a hay loader embodying the features of my invention.

Fig. 2 is a side elevation showing one of the ground wheels removed so as to more clearly show the various operating parts.

Fig. 3 is a sectional view taken on line 3—3 of Fig. 1, looking in the direction of the arrows.

Fig. 4 is a view of the opposite side of the machine with the inner ground wheel removed.

Fig. 5 is a sectional view taken on line 5—5 of Fig. 2.

Fig. 6 is a sectional view taken on line 6—6 of Fig. 2.

Fig. 7 is a sectional view taken on line 7—7 of Fig. 2.

Fig. 8 is a sectional view taken on line 8—8 of Fig. 7.

Fig. 9 is a sectional view taken on line 9—9 of Fig. 2.

Fig. 10 is a sectional view taken on line 10—10 of Fig. 2.

Fig. 11 is a detail view showing the manner in which the two sections of the compressor bars are connected.

Fig. 12 is a detail view of a portion of the rotary raking mechanism.

Fig. 13 is a sectional view taken on line 13—13 of Fig. 1.

Fig. 14 is a sectional view taken on line 14—14 of Fig. 13.

Fig. 15 is a sectional view taken on line 15—15 of Fig. 13.

Fig. 16 is a sectional detail taken on line 16—16 of Fig. 17.

Fig. 17 is a detail showing the manner in which the rake teeth are mounted.

Fig. 18 is a detail view of one of the rake teeth.

Throughout the drawings similar reference characters apply to similar parts.

As illustrated, my hay loader comprises a pair of ground wheels 20 and 21 mounted upon an axle 22. Pivotally mounted upon this axle is an inclined elevator comprising side bars 23—24 which extend upward and forwardly. Secured to these side bars near their lower ends are a pair of forwardly extending frame bars 25—26 which support the tongue 27, which may be connected with the wagon clevis 28 by means of a pivoted dog 29 or any other suitable manner. The particular construction of this hitch is not a part of my invention, but is made the subject matter of a separate application, Serial Number 664,699 filed Dec. 9, 1911. Extending upwardly from the frame bars 25—26 there are a pair of braces 30—31. The upper ends of these braces are connected with and support the upper ends of the side bars 23—24. A cross-brace 32 is provided which ties together the upper ends of these upwardly extending braces 30—31.

Rigidly mounted upon the shaft 22 there is a ratchet wheel 33, while loosely mounted upon this shaft there is a sprocket wheel 34, which sprocket wheel is provided with dogs 35 which engage with the teeth of the ratchet wheel 33. This construction is such that when the hay loader is moved forward the dogs 35 engage with the teeth of the ratchet wheel 33 to lock this ratchet wheel with the sprocket wheel 34. In backing the loader, however, the dogs pass idly over the teeth of the sprocket and thus do not transmit any power to the sprocket wheel 34.

Supported in the lower ends of the side bars 23—24 there is a shaft 36 upon which is pivotally mounted a rearwardly extending frame 37 which supports the rotary raking mechanism, to be hereinafter described. A gear wheel 38 is loosely mounted upon this shaft 36 and meshes with the gear wheel 34. A sprocket wheel 39 likewise mounted upon this shaft transmits power through the medium of the sprocket chain 40 to the sprocket wheel 41 mounted upon the shaft 42 of the rotary raking mechanism. This shaft 42 is mounted in suitable bearings 43 upon the frame 37.

Mounted upon one side of the frame 37 and eccentric to the shaft 42 there is a circular disk 44, which disk is provided with an annular groove 45. Mounted upon the shaft 42 there is a rotary rake comprising end pieces which are connected together by the longitudinally extending rake shafts 48. In the construction shown, I have illustrated the end pieces as comprising two cross arms and four rake shafts. It will, of course, be understood that if desired I could provide any suitable number of these cross arms and a corresponding number of rake shafts. Mounted upon these rake shafts there are a series of rake teeth 49, which rake teeth are constructed in the manner shown in detail in Figs. 16, 17 and 18. As there illustrated, it will be seen that each tooth is composed of a section of wire having a straight portion 50, and a coiled portion 51, which surrounds the shaft 48. The end of this coiled portion is bent backward as at 52, so as to form an elongated slot 53. These teeth are secured to the shaft 48 by means of a bolt 54 which engages with the slot 53 and a nut 54$^a$ threaded onto said bolt. By having this slot elongated in the manner shown it is possible, by first loosening the nut 54$^a$, to adjust the rake teeth individually to various angular positions, so that these teeth can be accurately and properly adjusted. Mounted upon one end of each of the rake shafts 48 there is a radially extending arm 55 which is provided with an end portion 56 which engages with the annular groove 45 in the eccentric circular disk 44.

Mounted upon opposite sides of the frame 37 there are a pair of upwardly extending braces 57 which are secured together by the tie bar 58. A pair of springs 59 are secured to opposite ends of this tie bar, the opposite ends of these springs being fastened to the side bars 23—24. These springs are for the purpose of counterbalancing the weight of the rearwardly extending frame and raking mechanism. In order to adjust the relative position of this frame 37, a revolving spindle 60, having a threaded end portion 61, is provided. It will readily be seen that by rotating this spindle in one direction or the other it can be lengthened or shortened and thus raise or lower the frame 37. In this manner the rotary rake may be adjusted so as to operate at a proper distance above the ground. Mounted upon the rear of the frame 37 there is a cross-bar 62 to which cross-bar the stripping loops 63 are secured. These stripping loops are curved downwardly around the lower end of the cross-bars 46—47, and then are bent upwardly, being secured at their forward ends to the tie bar 58.

Likewise mounted upon the shaft 36 there are a pair of sprocket wheels 64—65. Power for operating these sprocket wheels is derived from the shaft 22 by means of the belt 66 and the pulley 67 on the shaft 36. Passing around the sprocket wheels 64—65 there are a pair of endless conveyer chains 68—69, which conveyers pass upwardly along a suitable guide-way on the inside of the side bars 23—24, and pass over the pulleys 70—71 and around the pulleys 72—73 at the forward end of the conveyer. The pulleys 70—71 are mounted upon a shaft supported by end brackets 101—102 secured to the cross brace 32. The pulleys 72—73 are mounted on a shaft 103 supported in the forward ends of the hinged side bars 23$^a$—24$^a$ of the elevator. Secured to these conveyer chains there are a series of transverse slats 74, which are provided with upwardly extending teeth 75 for engaging the hay and feeding the same upward. An idler sprocket 76 is mounted in the central portion of the shaft about which passes the sprocket chain 77, which passes over the pulleys 78—79 in order to better support the central portion of the conveyer.

The upper portion of the conveyer, which includes the side bars 23$^a$—24$^a$, is hinged so that it is capable of swinging downward. This section is hinged upon the shaft 80 upon which shaft are also mounted the pulleys 70—71 and 78, about which the conveyer passes. By this construction, when the upper section of the elevator is raised or lowered the tension upon the conveyer chains is not changed in any way. This will be more readily apparent by reference to Fig. 2, for example, in which it is seen that the pulley 73 rotates about the axis of the pulley 70, so that this pulley 73 is always the same distance from the pulley 70, so that the length of the sprocket chain is not altered in any manner. In order to properly adjust the tension of this chain, I provide an adjusting means 81. I provide the following mechanism for raising and lowering the adjustable section of the conveyer: Mounted upon the side bar 24 there is an arc rack 82. A spring tooth 84 is adapted to engage with the ratchet-shaped teeth of the rack 82. The lever 83 is mounted on a transversely extending shaft 85 secured to the side bars 23—24. Extending downwardly from opposite ends of this shaft 85 and rigidly secured thereto there are a pair of arms 86—87. The lower ends of these arms are pivotally connected to a pair of forwardly extending links 88—89, the opposite ends of which links are secured to the opposite sides 23ª—24ª of the hinged portion of the elevator. From this it will be readily seen that by operating the lever 83 so as to rotate the shaft 85, through the medium of the arms 86—87 and links 88—89, the hinged section of the elevator may be raised or lowered. This operating mechanism is particularly desirable and efficient in that it is possible to raise and lower the elevator from the side, and while standing upon the hay wagon. It will be noticed that owing to the ratchet shape of the teeth of the rack that the upper section of the elevator can be raised independently of the lever 83, the spring tooth 84 riding over the teeth of the ratchet when the elevator section is moved in this direction. It is thus possible, as the wagon becomes loaded, to conveniently raise the end of the elevator to any desired height by merely pushing upward on the end of the elevator.

In order to properly retain the hay upon the elevator as it is passing upwardly over the same, I provide a series of compressor bars 90 which are mounted above the elevator. These compressor bars are loosely connected at their lower ends with the frame 37 by means of a link connection 91. This link is provided with openings through which pass the U-bolts 92—93. By this connection the lower ends of these compressor bars are permitted to rise or lower, depending upon the amount of hay carried by the elevator. These compressor bars are composed of two sections which are loosely hinged together in the manner shown in Fig. 11, the upper section 94 of these compressor bars extending forwardly above the hinged section of the elevator and being supported at or near the forward ends thereof by means of a cross-bar 95, which bar is supported by means of the braces 96. The ends of these braces are provided with an opening through which passes the rod 97, which rod is pivoted to the side bars. By this construction the sections 94 of the compressor bars are permitted to rise and lower as when they rise the cross-bar 95 and brace 96 merely slide upwardly upon the rod 97. Likewise the fact that this rod 97 is pivoted permits these sections 94 to move backward and forward slightly in order to allow for the swinging movement of the upper section of the elevator. In order to create a proper compression by these compressor bars 90, a cross-brace 98 is provided to the opposite ends of which are secured a pair of springs 99—100, the opposite ends of which springs are fastened to the side bars 23—24.

It is thought that the operation of the loader will be readily apparent from the description heretofore given. A brief description, however, is as follows: A wagon is first hitched to the hay loader by means of the clevis 28 and hitch 29, and then as the loader is drawn over the field the rotary rake is revolved in a forward direction at the ground line by power derived from the ground wheels by means of the chain of mechanism already described. As the teeth of the rake revolve, they are brought into position to rake the hay from the ground and then, as this rotation continues, they are drawn at right angles out of the hay, the stripping loops preventing the hay from remaining on the teeth, and the hay is thus fed to the endless conveyer. This operation of the raking teeth is caused by the arms 55, which, as the shaft 42 is rotated, cause the rake shaft with which they are connected to rotate, owing to the engagement of these arms with the eccentric ring 44. The eccentric ring is so positioned that this rotation of the rake shaft occurs at the point in the rotation where it is desired to draw the teeth from the hay. The hay being fed upon the elevator is then carried up over the same and onto the load. When the load on the wagon is low, the elevator can be adjusted so that the forward end of the elevator is near the level of the load. As the load becomes higher, the end of the elevator can be raised by the operator from the load by raising the elevator and the lever 83 will hold the elevator in the raised position as the teeth on the quadrant are of the ratchet pattern, the tension on the elevator chains, however, at all times remaining constant.

It will thus be seen that I have devised a very simple and efficient hay loader, and one which is adapted for the various needs and requirements of practical use. While I have illustrated one embodiment of my invention, it is to be understood that I do not wish to limit myself to the exact construction shown and described.

What I claim as my invention is:

1. In a hay loader, a jointed elevator embodying an endless conveyer, a series of compressor bars overlying said endless conveyer, a yielding revolving raking mechanism supported in the rear of said conveyer and having strippers associated therewith, and means flexibly connecting the lower ends of said compressor bars with said strippers so that the compressor bars may rise and fall to adapt themselves to the quantity of hay passing between themselves and the conveyer.

2. In a hay loader, a revolving raking mechanism, said mechanism comprising a central shaft and a plurality of rake shafts revolving about said central shaft, rake teeth mounted upon said rake shafts, a disk having a circular groove mounted eccentric to said central shafts, arms mounted upon said rake shafts and having end portions engaging with said groove, and flexible stripper members fixed with respect to said raking mechanism and extending around the underside and between the teeth thereof.

3. In a hay loader, a raking mechanism comprising a central shaft, arms outstanding from said central shaft, a plurality of revolving rake shafts mounted on said arms, rake teeth mounted upon said rake shafts, a disk having a circular groove mounted eccentric with respect to said central shaft, an arm mounted upon each of said rake shafts having end portions engaging with said grooves, whereby said arm and groove coöperate during the revolution of said raking mechanism to independently rotate said rake shafts in order to withdraw said rake teeth from the hay, and parallel flexible strippers extending around the under side of said raking mechanism and between the teeth thereof.

4. In a hay loader, an elevator embodying an endless conveyer, a series of compressor bars overlying said endless conveyer, a revolving raking mechanism for delivering hay to said conveyer, a stripper member extending around the underside of said raking mechanism, a swinging link secured at one end to said stripper, and at its other end to the lower end of said compressor bars, whereby said compressor bars are free to rise and fall according to the amount of hay passing between said bars and said endless conveyer.

5. In a hay loader, an elevator embodying an endless conveyer, a series of compressor bars overlying said endless conveyer, a revolving raking mechanism for delivering hay to said conveyer, stripper members associated with said raking mechanism, and links flexibly connecting said compressor bars at their lower ends to said strippers, whereby they are free to rise and fall according to the amount of hay passing between said bars and said endless conveyer.

6. In a hay loader, an elevator comprising upper and lower sections hinged together, a continuous conveyer passing over said elevator and bendable at the hinge in said elevator, means for raising and lowering the upper section of said elevator and conveyer, said means including a pivotally mounted hand lever, connections from said hand lever to said upper section, whereby rotation of said hand lever operates to lower said upper section, an arc rack mounted adjacent to said hand lever and having a series of ratchet teeth, a spring tooth carried by said hand lever and engaging with said teeth for holding the hand lever in position to prevent lowering of said upper section, said spring tooth being adapted to ride over said ratchet-shaped teeth, whereby said elevator section may be raised by upward pressure exerted on the end of said section, and means at the lower end of said elevator for gathering and delivering the hay to the elevator.

7. In a hay loader, an elevator comprising upper and lower sections hinged together, means for raising and lowering the upper section of said elevator, said means including a pivotally mounted hand lever, connections from said hand lever to said upper section, whereby rotation of said hand lever operates to lower said upper section, an arc rack mounted adjacent to said hand lever and having a series of ratchet teeth, a spring tooth carried by said hand lever and engaging with said teeth for holding the hand lever in position to prevent lowering of said upper section, said spring tooth being adapted to ride over said ratchet-shaped teeth, whereby said elevator section may be raised by upward pressure exerted on the end of said section, and means at the lower end of said elevator for gathering and delivering the hay to the elevator.

Signed by me at Rock Island, Illinois, this 28th day of Nov., 1911.

CLEMENS LECHTENBERG.

Witnesses:
EDWARD M. HEYLMAN,
GEO. H. SHELDON.

Copies of this patent may be obtained for five cents each, by addressing the "Commissioner of Patents, Washington, D. C."